(12) United States Patent
Maki et al.

(10) Patent No.: US 7,351,394 B2
(45) Date of Patent: *Apr. 1, 2008

(54) METHOD FOR PRODUCING α-ALUMINA POWDER

(75) Inventors: Hajime Maki, Niihama (JP); Yoshiaki Takeuchi, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 10/784,826

(22) Filed: Feb. 24, 2004

(65) Prior Publication Data
US 2004/0184984 A1 Sep. 23, 2004

(30) Foreign Application Priority Data
Feb. 26, 2003 (JP) ............................. 2003-048957

(51) Int. Cl.
*C01F 7/02* (2006.01)
(52) U.S. Cl. ....................... 423/625; 423/630; 423/631
(58) Field of Classification Search ................ 423/625, 423/631, 630
See application file for complete search history.

(56) References Cited
U.S. PATENT DOCUMENTS

| 4,308,088 A * | 12/1981 | Cherdron et al. ........... 423/625 |
| 4,657,754 A | 4/1987 | Bauer et al. |
| 5,935,550 A * | 8/1999 | Mohri et al. ................. 423/625 |
| 6,162,413 A * | 12/2000 | Fujiwara et al. ............. 423/625 |
| 2005/0008565 A1* | 1/2005 | Maki et al. .................. 423/625 |
| 2005/0201928 A1* | 9/2005 | Maki et al. .................. 423/625 |
| 2005/0204513 A1* | 9/2005 | Kajihara et al. ............... 23/301 |
| 2005/0214201 A1* | 9/2005 | Maruno et al. .............. 423/625 |

FOREIGN PATENT DOCUMENTS
JP 6-144830 A * 5/1994

OTHER PUBLICATIONS

Taichi Sato, "Aluminum Hydroxides and Aluminas", *Mineralogy Association Magazine*, vol. 19, No. 1, Mar. 1989, pp. 21-41.
A. Krell et al., "Nanocorundum—Advanced Synthesis and Processing", *NonoStructured Materials*, vol. 11, No. 8, 1999, pp. 1141-1153.
WPI Abstract of WO 2000/069790.
S. Rajendran et al., "Fabrication of a Fine Grained Alumina Ceramic", *Key Engineering Materials*, vol. 53-55, 1991, pp. 462-468.
B. Felde et ., ynthesis of Ultrafine Alumina Powder by Sol-Gel Techniques, *9th Cimitec World Ceramics Congress*, Ceramics Getting into the 2000's—Part B, 1999, pp. 49-56.
Y. Yang et al., "Preparation of Ultrafine α-$Al_2O_3$ Powder by Thermal Decomposition of ACCH at Low Temperature", *The Chinese Journal of Process Engineering*, vol. 2, No. 4, Aug. 2002, pp. 325-329.

* cited by examiner

*Primary Examiner*—Timothy C. Vanoy
(74) *Attorney, Agent, or Firm*—Sughrue Mion, PLLC

(57) ABSTRACT

A method for producing an α-alumina powder is described. The method for producing an α-alumina powder comprises a step of calcining an aluminum salt in the presence of a seed crystal at 600-890° C.

8 Claims, 1 Drawing Sheet

METHOD FOR PRODUCING α-ALUMINA POWDER

BACKGROUND OF THE INVENTION

1. Field of the Invention

The present invention relates to a method for producing an α-alumina powder.

2. Description of Related Art

An α-alumina powder is an aluminum compound represented by the formula $Al_2O_3$, and is widely used, for example, as a raw material for producing a sintered body such as a translucent tube. An α-alumina powder is required to have high content of α phase and relatively high BET specific surface area, since a sintered body of high strength is obtained easily and such an α-alumina powder can be easily dispersed in water.

As the method for producing an α-alumina powder, there are known, for example, methods of calcining an alumina hydrate in the presence of a seed crystal (Mineralogy Association magazine vol.19, No.1, pp.21-41, Japanese Patent Application Laid-Open (JP-A) No. 62-128918). However, in the methods described above, it is difficult to obtain an α-alumina powder having high content of α phase and relatively high BET specific surface area.

SUMMARY OF THE INVENTION

The present inventors have studied a method for producing an α-alumina powder, and resultantly completed the present invention.

Namely, the present invention provides a method for producing an α-alumina powder comprising a step of calcining an aluminum salt in the presence of a seed crystal at 600-890° C.

DETAILED DESCRIPTION OF THE PREFERRED EMBODIMENTS

Figure 1:
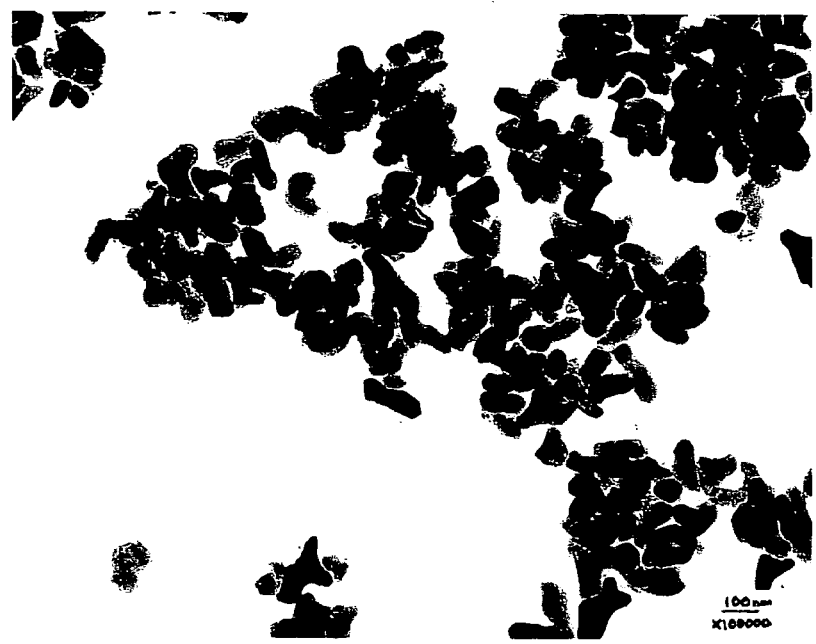
FIG. 1 shows a transmission electron micrograph of α-alumina power obtained in Example 1.
Figure 2:
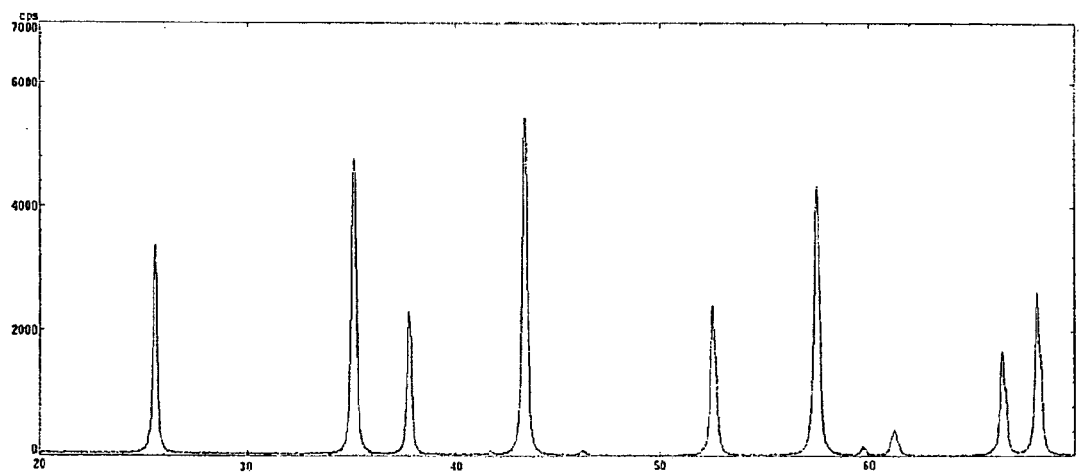
FIG. 2 shows an X-ray diffraction spectrum of α-alumina power obtained in Example 1.

The aluminum salt used in the production method of the present invention includes, for example, an inorganic aluminum salt such as aluminum nitrate, aluminum sulfate, ammonium aluminum sulfate and ammonium aluminum carbonate hydroxide, or a hydrate thereof; an organic aluminum salt such as aluminum oxalate, aluminum acetate, aluminum stearate, aluminum lactate and aluminum laurate, or a hydrate thereof; and preferably an inorganic aluminum salt or a hydrate thereof, further preferably aluminum nitrate or a hydrate thereof.

Examples of the seed crystal include metal oxides such as α-alumina ($Al_2O_3$), diaspore (AlOOH), iron oxide ($Fe_2O_3$), chromium oxide ($Cr_2O_3$) and titanium oxide ($TiO_2$). These seed crystals may be used singly or in combination of two or more. The seed crystal preferably has small average primary particle diameter, and has an average primary particle diameter of usually about 0.01 μm or more and 0.5 μm or less, and a BET specific surface area of usually 12 $m^2/g$ or more, preferably 15 $m^2/g$ or more and 150 $m^2/g$ or less. α-alumina used as the seed crystal may be prepared, for example, by pre-calcining aluminum hydroxide obtained by hydrolysis of aluminum isopropoxide and grinding the calcined aluminum hydroxide, then, calcining the aluminum hydroxide and grinding this. Diaspore, iron oxide, chromium oxide and titanium oxide may be prepared, for example, by a method for grinding a commercially available product.

The amount of a seed crystal is usually 1 part by weight or more, preferably 2 parts by weight or more, further preferably 4 parts by weight or more and usually 24 parts by weight or less per 100 parts by weight of the total amount of an aluminum salt and seed crystal in terms of the oxide of a metal component.

In the method for producing an α-alumina powder according to the present invention, the above-mentioned aluminum salt is calcined in the presence of a seed crystal.

In the production method, the seed crystal is preferably mixed with the above-mentioned aluminum salt. Mixing may be, advantageously conducted, for example, by a method in which an aluminum salt is added to a solvent to obtain a solution or slurry, a seed crystal is added to this, and then, the solvent is removed. By the above-mentioned mixing, an aluminum salt in which seed crystals are uniformly dispersed is obtained.

In mixing, a seed crystal may be dispersed in a solvent before adding to the above-mentioned solution or slurry, and then, the solvent is removed.

Further, mixing may be conducted also by a method in which a seed crystal is added to an aluminum salt, and the mixture is stirred. Stirring may be advantageously conducted by using an apparatus such as a vertical granulator and Henschel mixer. In this mixing, a seed crystal may be dispersed in a solvent before addition to the above-mentioned aluminum salt, and then, the solvent is removed.

Calcination is conducted at temperatures of 600° C. or more, preferably 700° C. or more and 890° C. or less, preferably 890° C. or less. Calcination is conduced usually in air or inert gas (nitrogen gas, argon gas and the like). Calcination may also be conducted in air of which partial pressure of water vapor is controlled, for example, in air having a partial pressure of water vapor of 600 Pa or less. The calcination time may be that which is necessary for transforming an aluminum salt to α-alumina, and varies depending on the kind and amount of a raw material of aluminum salt, the type of furnace described later, the calcination temperature and the calcination atmosphere, and usually about 10 minutes or more and about 24 hours or less. An apparatus used for calcination may advantageously be that which can calcine an aluminum salt under the above-mentioned conditions, and a static furnace, fluidized bed furnace and the like are listed. This apparatus may be batch-wise or continuous. Specific examples of the furnace include a tubular electric furnace, box-type electric furnace, tunnel furnace, far-infrared furnace, microwave furnace, shaft furnace, reflection furnace, rotary furnace, Roller Hearth furnace and the like.

An α-alumina powder obtained by calcination may be ground in view of obtaining a sintered body of high density. Grinding may be conducted using, for example, a medium pulverizer such as a vibration mill, ball mill, or an airflow pulverizer such as a jet mill. Further, an α-alumina powder obtained by calcination or an α-alumina powder subjected to the above-mentioned grinding may be classified.

An α-alumina powder obtained by the production method for the present invention has a BET specific surface area of usually about 13 $m^2/g$ or more, preferably about 15 $m^2/g$ or more. On the other hand, when the BET specific surface area of an α-alumina powder is too high, dispersibility in water may lower in some cases, therefore, it is preferably about 30 $m^2/g$ or less. Further, in an α-alumina powder, the main crystal phase is an α phase, and the α-ratio is usually about 93% or more, preferably about 95% or more. Further, the α-alumina powder is in the form of fine particle, and it average primary particle diameter is usually about 0.05 μm or more and about 1 μm or less.

The α-alumina powder obtained by the production method for the present invention has high BET specific surface area and high α-ratio as described above, as a result, is useful as a raw material for producing an α-alumina sintered body. The resulted α-alumina sintered body is suitable as a member for which high strength is required such as a cutting tool, bioceramics and bulletproof board. This α-alumina sintered body is, due to chemical stability such as excellent corrosion resistance, used as a part of an apparatus for producing a semiconductor such as a wafer handler; an electronic part such as an oxygen sensor; a translucent tube such as a sodium lamp and metal halide lamp; or a ceramic filter. A ceramic filter is used for removal of solid components contained in a exhaust gas, filtration of aluminum melt, filtration of foods (for example, beer), or selective permeation of gas produced at petroleum processing or $CO$, $CO_2$, $N_2$, $O_2$, $H_2$ gas.

The α-alumina powder obtained by the production method for the present invention is used as an additive, toner or resin filler for improving head cleaning property and friction resistance by addition thereof to an application layer of a magnetic medium of application type. An α-alumina powder can be used also as a polishing material. For example, a slurry obtained by dispersing an α-alumina powder in a medium such as water is suitable for polishing of semiconductor CMP and polishing of a hard disk substrate. A polishing tape obtained by coating an α-alumina powder on the surface of a tape is suitable for precise polishing of a hard disk and magnetic head.

Further, an α-alumina powder is used as an additive for cosmetics, an additive for brake linings, or a catalyst carrier, and further used as a material of electric conductive sintered bodies and heat conductive sintered bodies.

EXAMPLES

The following examples will illustrate the present invention in more detail, but do not limit the scope of the invention. The physical properties of an α-alumina powder were measured according to the following methods.

α-ratio (%):

It was calculated according to the following formula (1) from the peak strength $I_{\alpha(102)}$ of an alumina α phase (012) plane and the peak strength $I_{\theta(440)}$ of an alumina θ phase (440) plane, measured from a diffraction spectrum obtained by using a X-ray diffractometer.

$$\alpha\text{-ratio}=I_{\alpha(102)}/(I_{\alpha(102)}+I_{\theta(440)})\times 100(\%) \quad (1)$$

BET Specific Surface Area ($m^2/g$)

It was determined by a nitrogen adsorption method.

Average Primary Particle Diameter (μm):

In a transmission electron micrograph of an α-alumina powder, the maximum diameter along constant direction of each primary particle of any 20 or more particles was measured, and the average value of measured values was calculated.

Example 1

[Preparation of Seed Crystal Slurry]

Aluminum hydroxide obtained by hydrolysis of aluminum isopropoxide was pre-calcined to obtain a transition alumina in which the main crystal phase is θ and containing 3 wt % of α-alumina, then this transition alumina was ground using a jet mill, to obtain a powder having a bulk density of 0.21 $g/cm^3$.

100 g of this powder was charged in a furnace of a capacity of 8 L [trade name "Tubular atmospheric furnace" manufactured by Motoyama K.K.], and dry air having a dew point of −15° C. (partial pressure of water vapor: 165 Pa) was introduced at a rate of 1 L/minute into the furnace, and the powder was heated up to 1170° C. while maintaining the dew point of the atmosphere in the furnace at −15° C., and kept at this temperature for 3 hours, then, gradually cooled, obtaining an alumina substance thus calcined, then, this alumina calcined substance was ground using a vibration mill (grinding medium: alumina), to obtain α-alumina having a BET specific surface area of 16.0 m²/g.

20 parts by weight of this α-alumina was added to 80 parts by weight of nitric acid of pH 4, then, dispersion was conducted for 3 hours using a ball mill filled with alumina beads having a diameter of 2 mm, to obtain a seed crystal slurry.

[Production of α-Alumina Powder]

375.13 g (1 mol) of aluminum nitrate hydrate [$Al(NO_3)_3 \cdot 9H_2O$, manufactured by Wako Pure Chemical Industries, Ltd.] was dissolved in pure water, to obtain 1000 $cm^3$ of an aluminum nitrate aqueous solution. To 100 $cm^3$ of the aluminum nitrate aqueous solution was added 2.83 g ($Al_2O_3$ quantity: 0.566 g) of the above-mentioned seed crystal slurry, and this mixture was charged into a vessel of rotary evaporator. The pressure of an atmosphere in the vessel was reduced, and the vessel were heated by water of 75° C., to remove water in the mixture, obtaining powder. 100 parts by-weight of this powder contained 10 parts by weight of alumina [$Al_2O_3$] as a seed crystal. The powder was charged into an alumina crucible, and the alumina crucible was placed in a box-type electric furnace. It was calcined for 3 hours in air-of 850° C. The resulted α-alumina powder had an average primary particle diameter of 96 nm. The α-ratio and BET specific surface area of this α-alumina powder are shown in Table 1. The photograph of the α-alumina power is shown in FIG. 1.

TABLE 1

|  | α-ratio (%) | BET specific surface area ($m^2/g$) |
| --- | --- | --- |
| Example 1 | 98 | 15.9 |
| Example 2 | 97 | 13.3 |
| Comparative Example 1 | 99 | 10.1 |

Example 2

The same operation as in Example 1 was conducted except that the calcination temperature was changed to 890° C. The properties of the resulted α-alumina powder are shown in Table 1.

Comparative Example 1

The same operation as in Example 1 was conducted except that the calcination temperature was changed to 925° C. The properties of the resulted powder are shown in Table 1.

Example 3

100 g of aluminum nitrate hydrate [$Al(NO_3)_3 \cdot 9H_2O$, manufactured by Wako Pure Chemical Industries, Ltd.] and 1.5 g of alumina having a BET specific surface area of 16.0 $m^2/g$ obtained in Example 1 [Preparation of seed crystal slurry] were mixed using a mortar to obtain a powder. 100 parts by weight of this powder contained 10 parts by weight of alumina [$Al_2O_3$] as a seed crystal.

The powder was charged into an alumina crucible, and the alumina crucible was placed in a box-type electric furnace, then, calcined for 3 hours in air of 870° C. The resulted α-alumina powder had an average primary particle diameter of 110 nm. The α-ratio and BET specific surface area of this α-alumina powder are shown in Table 2.

Example 4

The same operation as in Example 3 was conducted except that the calcination temperature was changed to 850° C. The properties of the resulted α-alumina powder are shown in Table 2.

TABLE 2

|  | α-ratio (%) | BET specific surface area (m²/g) |
|---|---|---|
| Example 3 | 96 | 17.4 |
| Example 4 | 97 | 18.9 |

Comparative Example 2

Aluminum nitrate hydrate [Al(NO₃)₃·9H₂O, manufactured by Wako Pure Chemical Industries, Ltd., Guaranteed Reagent] was charged into an alumina crucible without adding a seed crystal, and the alumina crucible was placed in a box-type electric furnace, then, calcined for 3 hours in air of 870° C. The resulted powder showed an X-ray diffraction spectrum containing no peak showing the presence of an α phase. The properties of this powder are shown in Table 3.

Comparative Example 3 le;.5qThe same operation as in Comparative Example 2 was conducted except that the calcination temperature was changed to 900° C. The properties of the resulted powder are shown in Table 3.

Comparative Example 4

The same operation as in Comparative Example 2 was conducted except that the calcination temperature was changed to 950° C. The properties of the resulted powder are shown in Table 3.

Comparative Example 5

The same operation as in Comparative Example 2 was conducted except that the calcination temperature was changed to 970° C. The properties of the resulted powder are shown in Table 3.

TABLE 3

|  | α-ratio (%) | BET specific surface area (m²/g) |
|---|---|---|
| Comparative Example 2 | 0 | 111 |
| Comparative Example 3 | 0 | 107 |
| Comparative Example 4 | 91 | 41 |
| Comparative Example 5 | 98 | 9.9 |

What is claimed is:

1. A method for producing an α-alumina powder consisting essentially of steps of:
   mixing an aluminum salt with a seed crystal by a method in which the aluminum salt is added to a solvent to obtain a solution or slurry, the seed crystal is added to said solution or slurry, and the solvent is then removed, and
   calcining the resulting mixture at 600-890° C.

2. The method according to claim 1, wherein the aluminum salt is at least one selected from the group consisting of inorganic aluminum salts, hydrates thereof, organic aluminum salts and hydrates thereof.

3. The method according to claim 2, wherein the inorganic aluminum salt is at least one selected from the group consisting of aluminum nitrate, aluminum sulfate, ammonium aluminum sulfate and ammonium aluminum carbonate hydroxide.

4. The method according to claim 3, wherein the inorganic aluminum salt is aluminum nitrate.

5. The method according to claim 2, wherein the organic aluminum salt is at least one selected from the group consisting of aluminum oxalate, aluminum acetate, aluminum stearate, aluminum lactate and aluminum laurate.

6. The method according to claim 1, wherein the seed crystal is at least one selected from the group consisting of α-alumina, diaspore, iron oxide, chromium oxide and titanium oxide.

7. The method according to claim 1, wherein the seed crystal has a BET specific surface area of 12 m2/g or more.

8. The method according to claim 7, wherein the seed crystal has a BET specific surface area of 15-150 m2/g.

* * * * *